United States Patent
Tabrizi et al.

(10) Patent No.: US 9,798,334 B1
(45) Date of Patent: Oct. 24, 2017

(54) METHOD AND SYSTEM FOR IMPROVING FLASH STORAGE PERFORMANCE FOR VARIOUS TYPES OF WORKLOADS BY MODULATING OPERATING TEMPERATURE

(71) Applicant: EMC Corporation, Santa Clara, CA (US)

(72) Inventors: Haleh Tabrizi, Santa Clara, CA (US); Rajiv Agarwal, Santa Clara, CA (US); Jeffrey Paul Ferreira, Santa Clara, CA (US); Michael W. Shapiro, Menlo Park, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 469 days.

(21) Appl. No.: 14/502,297

(22) Filed: Sep. 30, 2014

(51) Int. Cl.
G05D 23/19 (2006.01)
G06F 1/20 (2006.01)

(52) U.S. Cl.
CPC ......... *G05D 23/19* (2013.01); *G05D 23/1902* (2013.01); *G06F 1/206* (2013.01); *G05B 2219/2614* (2013.01)

(58) Field of Classification Search
CPC ............... G05B 15/02; G05B 19/404; G05B 2219/2614; G05B 2219/21156; G05D 23/00; G05D 23/19; G05D 23/1902; G06F 1/20; G06F 1/203; G06F 1/206; G06F 11/3058
See application file for complete search history.

(56) References Cited

U.S. PATENT DOCUMENTS

| 6,016,275 | A | 1/2000 | Han | |
|---|---|---|---|---|
| 7,620,613 | B1 * | 11/2009 | Moore | G06F 1/206 700/28 |
| 8,843,354 | B2 * | 9/2014 | Lugo | G06F 17/5009 703/1 |
| 2006/0279869 | A1 * | 12/2006 | Yamamoto | G06F 1/206 360/69 |
| 2012/0066439 | A1 * | 3/2012 | Fillingim | G06F 11/3485 711/103 |
| 2012/0331207 | A1 * | 12/2012 | Lassa | G06F 1/3278 711/103 |

(Continued)

OTHER PUBLICATIONS

H. Choi, W. Liu, and W. Sung, "VLSI implementation of BCH error correction for multilevel cell nand flash memory," Very Large Scale Integration (VLSI) Systems, IEEE Transactions on, vol. 18, No. 5, pp. 843-847, 2010.

(Continued)

*Primary Examiner* — Ryan Reis
(74) *Attorney, Agent, or Firm* — Chamberlain, Hrdlicka, White, Williams & Aughtry

(57) ABSTRACT

A method for managing a storage appliance. The method includes determining an input/output (I/O) workload characterization (IWC) for the storage appliance. The method further includes determining an optimized temperature for the storage modules in the storage appliance based on the IWC, determining that a current temperature of the storage modules is not the optimized temperature, and modifying operation of at least one active cooling component in the storage appliance to change the current temperature of the storage modules to the optimized temperature.

20 Claims, 7 Drawing Sheets

(56) References Cited

U.S. PATENT DOCUMENTS

| | | | | |
|---|---|---|---|---|
| 2014/0101371 A1* | 4/2014 | Nguyen | ............... | G06F 3/0616 711/103 |
| 2014/0181595 A1* | 6/2014 | Hoang | ............... | G06F 11/3034 714/47.3 |
| 2015/0338910 A1* | 11/2015 | Allen-Ware | ......... | G06F 1/3225 713/320 |

OTHER PUBLICATIONS

T.-H. Chen, Y.-Y. Hsiao, Y.-T. Hsing, and C.-W. Wu, "An adaptive-rate error correction scheme for NAND flash memory," in 2009 27th IEEE VLSI Test Symposium, 2009, pp. 53-58.

E. Gal and S. Toledo, "Algorithms and data structures for flash memories," ACM Computing Surveys (CSUR), vol. 37, No. 2, pp. 138-163, 2005.

M. Rosenblum and J. K. Ousterhout, "The design and implementation of a log-structured file system," ACM Transactions on Computer Systems (TOCS), vol. 10, No. 1, pp. 26-52, 1992.

C. Park, W. Cheon, J. Kang, K. Roh, W. Cho, and J.-S. Kim, "A reconfigurable FTL (flash translation layer) architecture for NAND flashbased applications," ACM Transactions on Embedded Computing Systems (TECS), vol. 7, No. 4, p. 38, 2008.

Y. Cai, G. Yalcin, O. Mutlu, E. F. Haratsch, A. Cristal, O. S. Unsal, and K. Mai, "Flash correct-and-refresh: Retention-aware error management for increased flash memory lifetime," in Computer Design (ICCD), 2012 IEEE 30th International Conference on. IEEE, 2012, pp. 94-101.

B. Shin, C. Seol, J.-S. Chung, and J. J. Kong, "Error control coding and signal processing for flash memories," in Circuits and Systems (ISCAS), 2012 IEEE International Symposium on. IEEE, 2012, pp. 409-412.

H. Tabrizi, G. Farhadi, and J. Cioffi, "A learning-based network selection method in heterogeneous wireless systems," in Global Telecommunications Conference (GLOBECOM 2011), 2011 IEEE, Dec. 2011, pp. 1-5.

N. Mielke, H. Belgal, A. Fazio, Q. Meng, and N. Righos, "Recovery effects in the distributed cycling of flash memories," in Reliability Physics Symposium Proceedings, 2006. 44th Annual., IEEE International, Mar. 2006, pp. 29-35.

R. Pyndiah, A. Glavieux, A. Picart, and S. Jacq, "Near optimum decoding of prodcut codes," iin Proc. IEEE Global Telecommunications Conference GLOBECOM, pp. 339-343, 1994.

J. Han and L. A. Lastras-Montano, "Reliable memories with subline accesses," in Proc. 2010 IEEE Int. Symp. on Inform. Theory (ISIT), pp. 2531-2535, Jul. 2010.

A. S. Rawat, D. S. Papailiopoulos, A. G. Dimakis, and S. Vishwanath, "Locality and availability in distributed storage," Preprint available at http://arxiv.org/abs/1402.2011, Feb. 2014.

P. Gopalan, C. Huang, H. Simitci, and S. Yekhani, "On the locality of codeword Symbols," Preprint available at http://arxiv.org/abs/1106. 3625., Jun. 2011.

F. Oggier and A. Datta, "Self-repairing homomorphic codes for distributed storage systems," in Proc. IEEE International Conference on Computer Communications (Infocom), Shanghai, China, Apr. 2011.

D. Papailiopoulos, J. Luo, A. Dimakis, C. Huang, and J. Li, "Simple regenerating codes: network coding for cloud storage," IEEE International Conference on Computer Communications (Infocom), 2012.

O. Khan, R. Burns, J. Plank, and C. Huang, "In search of I/O-optimal recovery from disk failures," in Hot Storage 2011, 3rd Workshop on Hot Topics in Storage and File Systems, Portland, OR, Jun. 2011.

C. Huang, M. Chen, and J. Li, "Pyramid codes: flexible schemes to trade space for access efficiency in reliable data storage systems," in Proc. IEEE International Symposium on Network Computing and Applications (NCA), Cambridge, MA, Jul. 2007.

H. Zhou, A. Jiang, and J. Bruck, "Error-correcting schemes with dynamic thresholds in nonvolatile memories," in Information Theory Proceedings (ISIT), 2011 IEEE International Symposium on. IEEE, 2011, pp. 2143- 2147.

B. Peleato, R. Agarwal, J. Cioffi, M. Qin, and P. H. Siegel, "Towards minimizing read time for NAND flash," in Global Communications Conference (GLOBECOM), 2012 IEEE. IEEE, 2012, pp. 3219-3224.

Y. Kim, B. Vijaya Kumar, K. L. Cho, H. Son, J. Kim, J. J. Kong, and J. Lee, "Modulation coding for flash memories," in Computing, Networking and Communications (ICNC), 2013 International Conference on. IEEE, 2013, pp. 961-967.

Y. Cai, O. Mutlu, E. F. Haratsch, and K. Mai, "Program interference in MLC NAND flash memory: Characterization, modeling, and mitigation," in Computer Design (ICCD), 2013 IEEE 31st International Conference on. IEEE, 2013, pp. 123-130.

Y. Cai, E. F. Haratsch, O. Mutlu, and K. Mai, "Threshold voltage distribution in mlc nand flash memory: Characterization, analysis, and modeling," in Proceedings of the Conference on Design, Automation and Test in Europe. EDA Consortium, 2013, pp. 1285-1290.

E. Yaakobi, J. Ma, L. Grupp, P. Siegel, S. Swanson, and J. Wolf, "Error characterization and coding schemes for flash memories," in GLOBECOM Workshops (GC Wkshps), 2010 IEEE. IEEE, Dec. 2010, pp. 1856-1860.

B. Peleato and R. Agarwal, "Maximizing MLC NAND lifetime and reliability in the presence of write noise," in Proc. of IEEE International Conf. Comm., 2012.

* cited by examiner

METHOD AND SYSTEM FOR IMPROVING FLASH STORAGE PERFORMANCE FOR VARIOUS TYPES OF WORKLOADS BY MODULATING OPERATING TEMPERATURE

BACKGROUND

Storage systems include multiple components. Many of these components, when performing various operations, generate heat. The storage systems typically attempt to dissipate the generated heat using, for example, fans and/or heat sinks.

SUMMARY

In general, in one aspect, the invention relates to a method for managing a storage appliance. The method includes determining an input/output (I/O) workload characterization (IWC) for the storage appliance, determining an optimized temperature for a plurality of storage modules in the storage appliance based on the IWC, determining that a current temperature of the plurality of storage modules is not the optimized temperature, and modifying operation of at least one active cooling component in the storage appliance to change the current temperature of the plurality of storage modules to the optimized temperature.

In general, in one aspect, the invention relates to a system. The system includes a storage module comprising a storage module controller and persistent storage, and a control module operatively connected to the storage module and a client, an active cooling component operatively connected to the control module, wherein the control module determines an input/output (I/O) workload characterization (IWC) for the storage appliance, determines an optimized temperature for the storage module in the storage appliance based on the IWC, determines that a current temperature of the storage module is not the optimized temperature, and modifies operation of the active cooling component to change the current temperature of the storage module to the optimized temperature.

In general, in one aspect, the invention relates to a non-transitory computer readable medium comprising computer readable program code to: determine an input/output (I/O) workload characterization (IWC) for the storage appliance, determine an optimized temperature for a plurality of storage modules in the storage appliance based on the IWC, determine that a current temperature of the plurality of storage modules is not the optimized temperature, and modify operation of at least one active cooling component in the storage appliance to change the current temperature of the plurality of storage modules to the optimized temperature.

Other aspects of the invention will be apparent from the following description and the appended claims.

BRIEF DESCRIPTION OF DRAWINGS

FIGS. 5A-6 show methods in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to modulating the operating temperature of the solid-state memory modules (SSMMs) in order to improve performance of the storage appliance. More specifically, embodiments of the invention relate to changing the operating temperature of the SSMMs based on the type of I/O requests (also referred to as "I/O workload characterization (IWC)") that the SSMMs is/will be servicing. By modulating the temperature of the SSMMs based on IWC, the storage appliance can take advantage of the performance differences of the SSMMs when servicing I/O requests at different temperatures. For example, in one embodiment of the invention, read requests are performed more efficiently by the SSMMs when the temperature is relatively low (e.g., 20° C.) and write requests are performed more efficiently when the temperature is relatively high (e.g., 70° C.). Accordingly, when the IWC indicates that the workload is predominately read requests, the storage appliance may take actions to lower the operating temperature of the SSMMs and when the IWC indicates that the workload is predominately write requests, the storage appliance may take actions to increase the operating temperatures of the SSMMs.

The following description describes one or more systems and methods for implementing one or more embodiments of the invention.

Figure 1A:
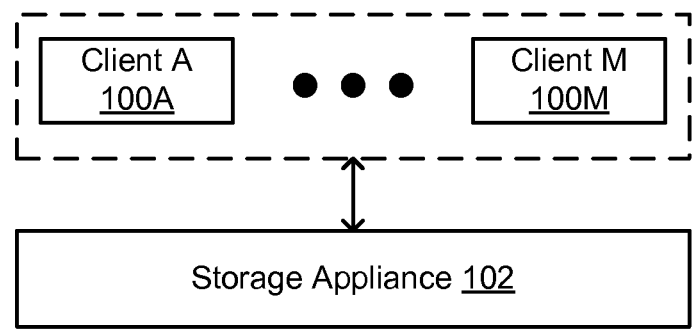
FIGS. 1A-1C show systems in accordance with one or more embodiments of the invention.
Figure 1B:
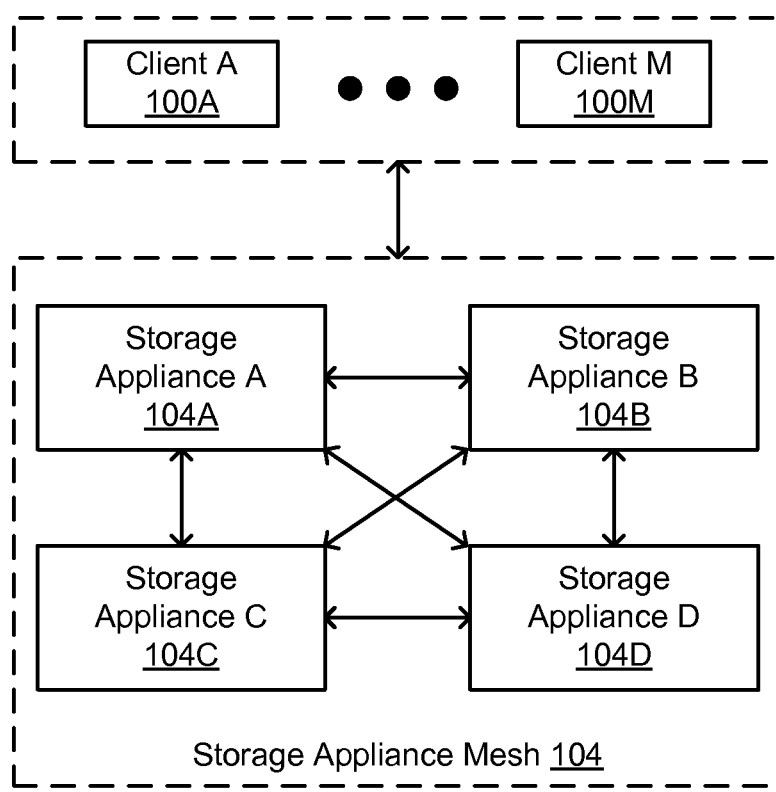
Figure 1C:
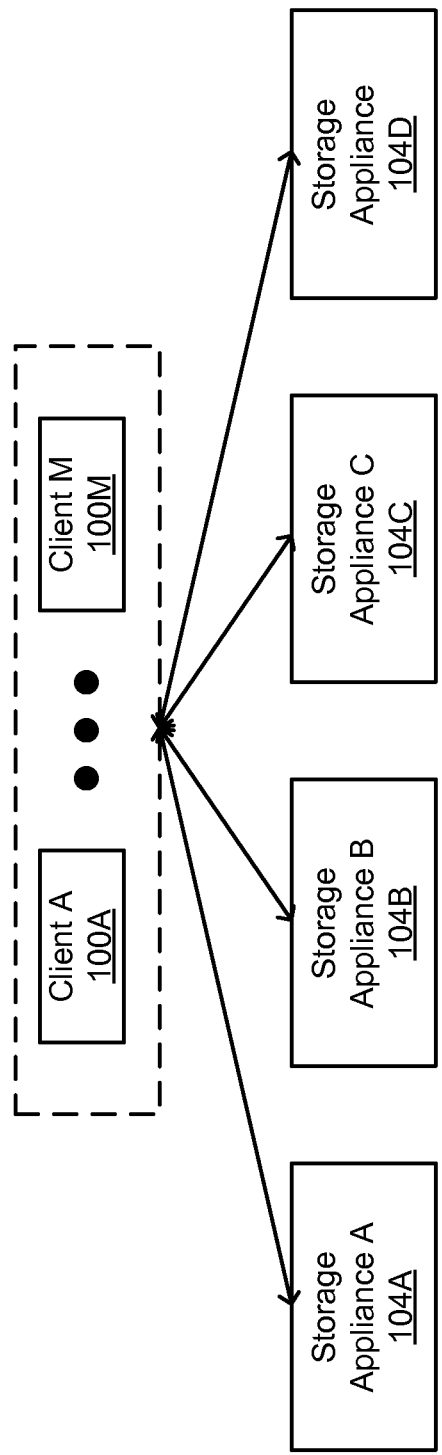

FIGS. 1A-1C show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any physical system that includes the functionality to issue a read request to the storage appliance (102) and/or issue a write request to the storage appliance (102). Though not shown in FIG. 1A, each of the clients (100A, 100M) may include a client processor (not shown), client memory (not shown), and any other software and/or hardware necessary to implement one or more embodiments of the invention.

In one embodiment of the invention, the client (100A, 100M) is configured to execute an operating system (OS) that includes a file system. The file system provides a mechanism for the storage and retrieval of files from the storage appliance (102). More specifically, the file system includes functionality to perform the necessary actions to issue read requests and write requests to the storage appliance. The file system also provides programming interfaces to enable the creation and deletion of files, reading and writing of files, performing seeks within a file, creating and deleting directories, managing directory contents, etc. In addition, the file system also provides management interfaces to create and delete file systems. In one embodiment of the invention, to access a file, the operating system (via the file system) typically provides file manipulation interfaces to open, close, read, and write the data within each file and/or to manipulate the corresponding metadata.

Continuing with the discussion of FIG. 1A, in one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one embodiment of the invention, the storage appliance (102) is a system that includes volatile and persistent storage and is configured to service read requests and/or write requests from one or more clients (100A, 100M). Various embodiments of the storage appliance (102) are described below in FIG. 2.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Those skilled in the art will appreciate that while FIGS. 1A-1C show storage appliances connected to a limited number of clients, the storage appliances may be connected to any number of clients without departing from the invention. Those skilled in the art will appreciate that while FIGS. 1A-1C show various system configurations, the invention is not limited to the aforementioned system configurations. Further, those skilled in the art will appreciate that the clients (regardless of the configuration of the system) may be connected to the storage appliance(s) using any other physical connection without departing from the invention.

Figure 2:
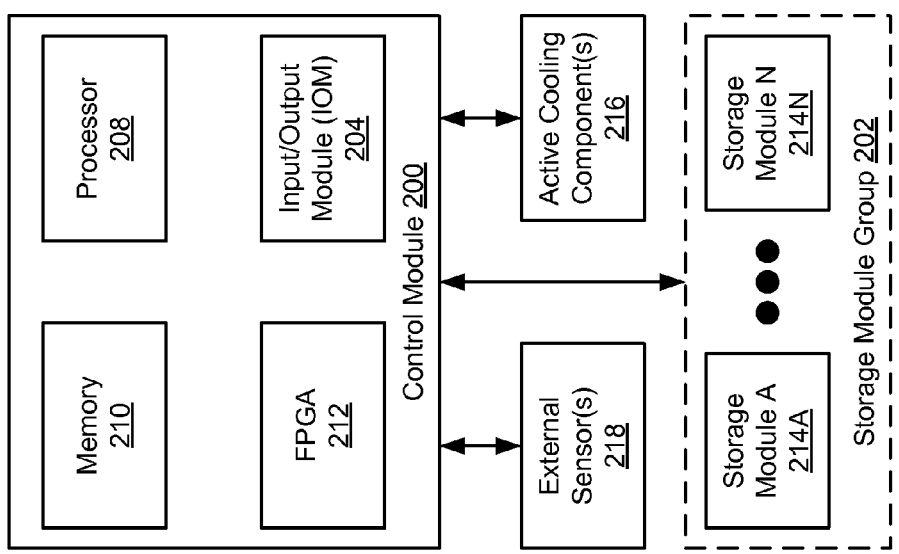
FIG. 2 shows storage appliances in accordance with one or more embodiments of the invention.

FIG. 2 shows embodiments of a storage appliance in accordance with one or more embodiments of the invention. The storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. In addition, the control module (200) includes functionality to perform various garbage collection operations. The operation of the control module with respect to servicing I/O requests is described below with reference to FIG. 5. The control module also includes functionality to modify the operating temperature of the operating temperature of the solid-state memory modules (see FIGS. 5B and 6 below). Additional details about the components in the control module are included below.

Continuing with the discussion of FIG. 2, in one embodiment of the invention, the control module (200) includes an Input/Output Module (IOM) (204), a processor (208), a memory (210), and, optionally, a Field Programmable Gate Array (FPGA) (212). In one embodiment of the invention, the IOM (204) is the physical interface between the clients (e.g., 100A, 100M in FIGS. 1A-1C) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with FIG. 2, the processor (208) is a group of electronic circuits with a single core or multi-cores that are configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (not shown), where the in-memory data structure is stored in the memory (210). In one embodiment of the invention, the in-memory data structure includes information described in FIG. 4.

In one embodiment of the invention, the processor is configured to offload various types of processing to the FPGA (212). In one embodiment of the invention, the FPGA (212) includes functionality to calculate checksums for data that is being written to the storage module(s) and/or data that is being read from the storage module(s). Further, the FPGA (212) may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment of the invention, the storage module group (202) includes one or more storage modules (214A, 214N) each configured to store data. One embodiment of a storage module is described below in FIG. 3.

In one embodiment of the invention, the storage module includes one or more active cooling components (216). The active cooling components may be any physical component that is able to modify the temperature of the SSMMs (not shown) in the storage modules (214A, 214N). A non-limiting example of an active cooling component is a fan. One or more active cooling components may be located within the storage appliance (i.e., within the chassis of the storage appliance) and positioned in order to enable it/them to modify the temperature of the SSMMs based on instructions from the control module. Additionally, or alternatively, one or more active cooling components may be located outside the storage appliance (i.e., outside the chassis of the storage appliance) and positioned in order to enable it to modify the temperature of the SSMMs based on instructions from the control module.

In one embodiment of the invention, the storage appliance may include one or more external sensor(s) (218) (i.e., the external sensor is located within the chassis). The external sensor(s) is operatively connected to the control module and is configured to monitor the internal temperature of the storage appliance (i.e., the temperature within the chassis) and/or the external temperature of the storage modules (214A, 214N) (e.g., the temperature on the external cover of the storage module). The external sensor(s) (218) may be any type of sensor that is suitable to monitor temperature as described above.

Figure 3:
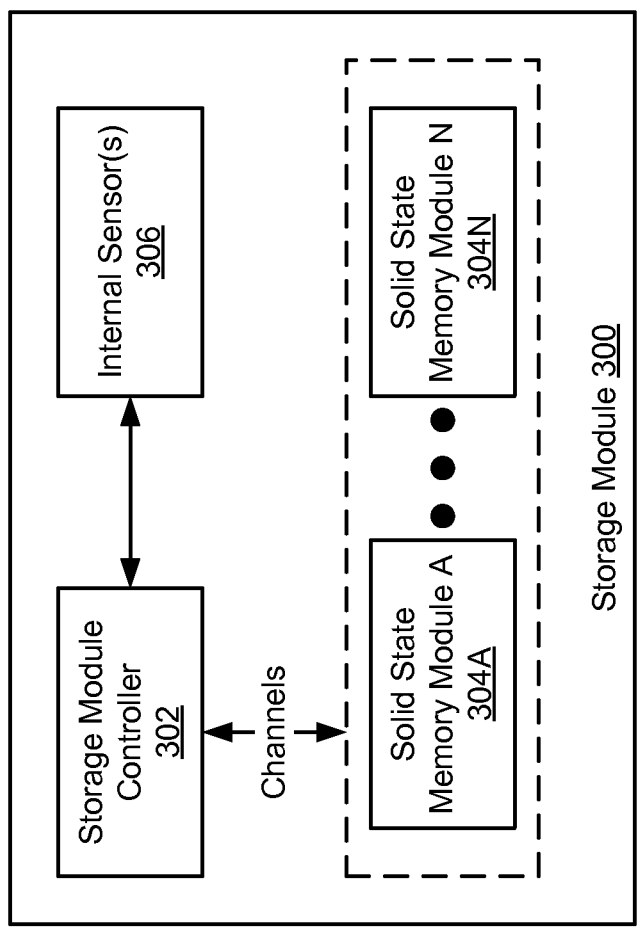
FIG. 3 shows a storage module in accordance with one or more embodiments of the invention.

FIG. 3 shows a storage module in accordance with one or more embodiments of the invention. The storage module (300) includes a storage module controller (302), memory (not shown), one or more internal sensors(s) (306) and one or more solid-state memory modules (304A, 304N). Each of these components is described below.

In one embodiment of the invention, the storage module controller (302) is configured to receive read and/or write requests from the control module. Further, the storage module controller (300) is configured to service the read and write requests using the memory (not shown) and/or the solid-state memory modules (304A, 304N).

In one embodiment of the invention, the memory (not shown) corresponds to any volatile memory including, but not limited to, Dynamic Random-Access Memory (DRAM), Synchronous DRAM, SDR SDRAM, and DDR SDRAM.

In one embodiment of the invention, the solid-state memory modules correspond to any data storage device that uses solid-state memory to store persistent data. In one embodiment of the invention, solid-state memory may include, but is not limited to, NAND Flash memory and NOR Flash memory. Further, the NAND Flash memory and the NOR flash memory may include single-level cells (SLCs), multi-level cell (MLCs), or triple-level cells (TLCs). Those skilled in the art will appreciate that embodiments of the invention are not limited to storage class memory.

In one embodiment of the invention, the internal sensor(s) (306) is located within the storage module and operatively connected to the storage module controller (302). The internal sensor(s) (306) is used to determine the internal temperature of the storage module and/or the temperatures of one or more SSMMs. The internal sensor(s) may provide the temperature information to the storage module controller (302). The storage module controller (302) may then provide the temperature information to the control module (FIG. 2, 200). The temperature information may be communicated from the storage module controller and control module using any known data transfer mechanism. The internal sensor(s) (306) may be any type of sensor that is suitable to monitor temperature as described above.

Figure 4:
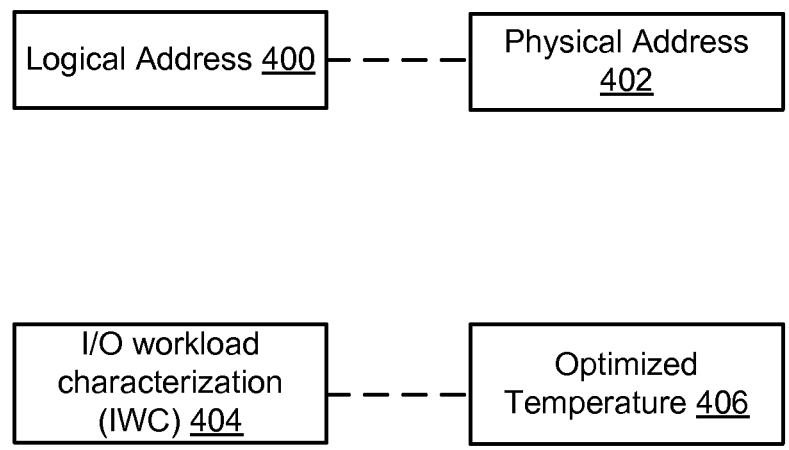
FIG. 4 shows the relationship between various components in accordance with one or more embodiments of the invention.
Figure 5:
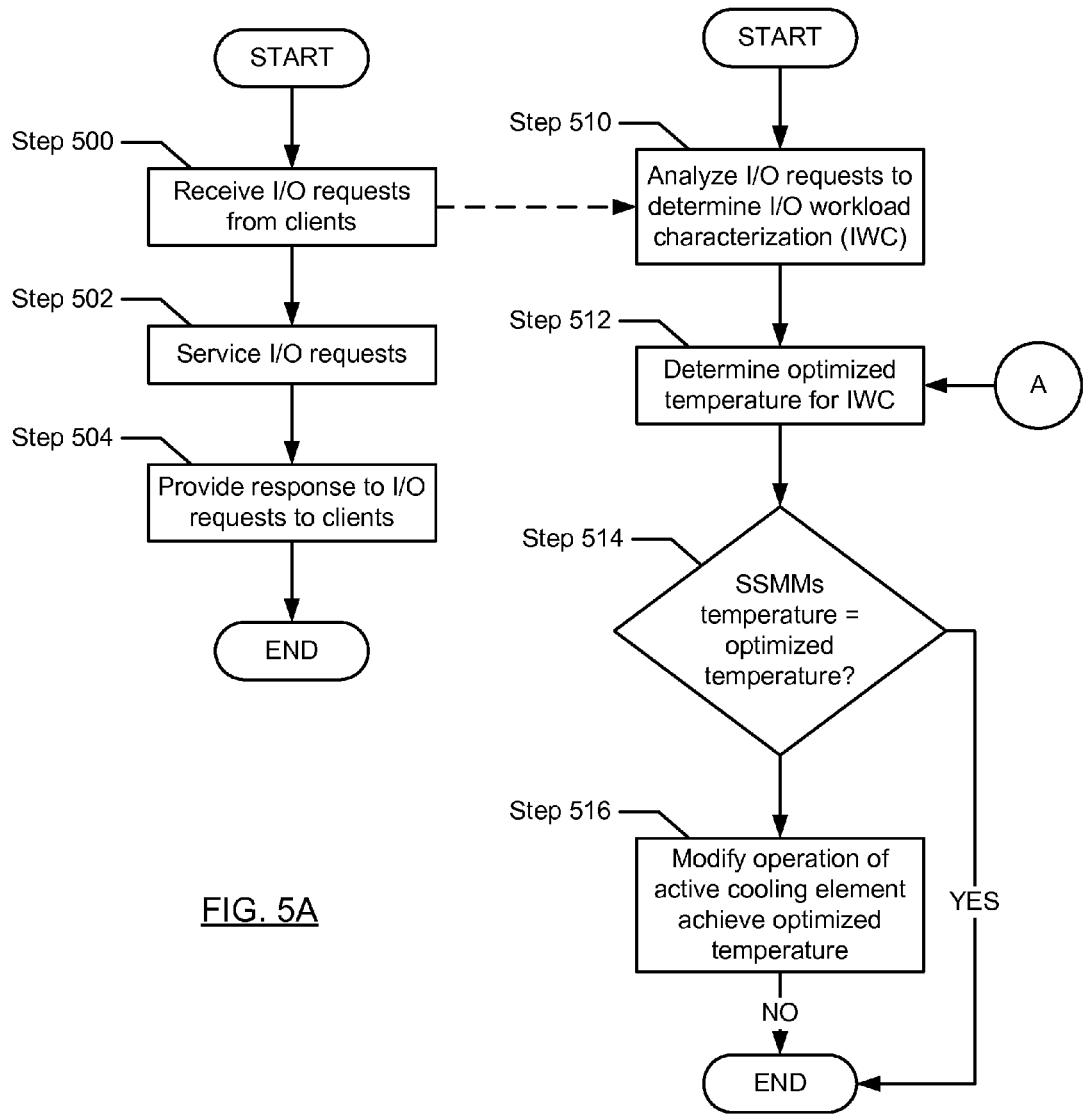

FIG. 4 shows the relationship between various components in accordance with one or more embodiments of the invention. More specifically, FIG. 4 shows the various types of information that are stored in the memory of the control module. Further, the control module includes functionality to update the information stored in the memory of the control module. The information described below may be stored in one or more in-memory data structures. Further, any data structure type (e.g., arrays, linked lists, hash tables, etc.) may be used to organize the following information within the in-memory data structure(s) provided that the data structure type(s) maintains the relationships (as described below) between the information.

The memory includes a mapping of logical addresses (400) to physical addresses (402). In one embodiment of the invention, the logical address (400) is an address at which the data appears to reside from the perspective of the client (e.g., 100A, 100M in FIG. 1A). Said another way, the logical address (400) corresponds to the address that is used by the file system on the client when issuing a read request to the storage appliance.

In one embodiment of the invention, the logical address is (or includes) a hash value generated by applying a hash function (e.g., SHA-1, MD-5, etc.) to an n-tuple, where the n-tuple is <object ID, offset ID>. In one embodiment of the invention, the object ID defines a file and the offset ID defines a location relative to the starting address of the file. In another embodiment of the invention, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset ID. Those skilled in the art will appreciate that multiple logical addresses may be mapped to a single physical address, and that the logical address content and/or format is not limited to the above embodiments.

In one embodiment of the invention, the physical address (402) corresponds to a physical location in a solid-state memory module (304A, 304N) in FIG. 3. In one embodiment of the invention, the physical address is defined as the following n-tuple: <storage module, channel, chip enable, LUN, plane, block, page number, byte>.

In one embodiment of the invention, the memory includes a mapping between I/O workload characterization (IWC) and optimized temperature (406). The IWC specifies the proportion of read requests to write requests that the storage appliance is/will be processing. The granularity of the IWC may vary based on the implementation. For example, the IWC may be specified with a low level of granularity where the IWC only has three potential states: proportion of read requests>70%, proportion of read requests<70% and >30%, or proportion of read requests<30%. Alternatively, the IWC may be specified at a high level of granularity, e.g., at 10% increments. For example, the IWC may be specified as follows: proportion of read requests≤10%, proportion of read request≥10% but less then 20%, etc. The above examples are not intended to limit the scope of the invention. Other schemes for representing the IWC may be used without departing from the invention.

In one embodiment of the invention, the IWC only takes into account client read requests and client write requests (i.e., I/O requests issued by a client, see FIG. 1, 100A). Alternatively, the IWC only takes into account I/O requests issued by clients and I/O requests initiated by the control module (e.g., I/O requests that are part of garbage collection operations and/or data migration operations). The aforementioned I/O requests are described below.

In one embodiment of the invention, a client read request is issued by a client (e.g., FIG. 1A, 100A) where the read request includes a logical address. The response to the read request is: (i) data retrieved from the storage module or (ii) a notification indicating the data is corrupted (i.e., the data cannot be retrieved from the storage module and/or the data cannot be corrected or reconstructed using error correcting mechanisms implemented by the storage module controller and/or the control module).

In one embodiment of the invention, a client write request is issued by a client (e.g., FIG. 1A, 100A) where the write request includes data or a reference to data that is to be stored in the storage modules. Upon receipt of a write request, the control module determines one or more pages to be used to store the data in the persistent storage.

In one embodiment of the invention, the garbage collection operations are performed as part of a garbage collection process implemented by the control module. The aim of the garbage collection process is to reclaim dead pages (i.e., pages that no longer include live data (i.e., data that is being used by the control module and/or one or more applications executing on a client)). This may be achieved by: (i) identifying blocks in the storage modules that include a combination of live pages and dead pages; and (ii) moving the live data to one or more pages in another block(s) in the storage modules that only includes live pages.

In one embodiment of the invention, a data migration operation corresponds to a series of read requests and write requests that are initiated by the control module in order to copy data from one storage module(s) to another storage module. For example, if one storage module is going to be replaced, the control module may initiate migration of the data from that storage module to another storage module in the storage appliance.

Continuing with the discussion of FIG. 4, in one embodiment of the invention, the optimized temperature (406) may be a single temperature or a temperature range. The optimized temperature corresponds to the temperature at which the SSMMs perform most efficiently for a given IWC. Said another way, at the optimized temperature for a given IWC, the SSMMs service I/O requests with less latency and/or less errors relatively to when the same I/O requests are serviced at temperatures other than the optimized temperature. The optimized temperature may be determined experimentally and then the resulting information may then be provided to (or otherwise obtained by) the control module. In one embodiment of the invention, the optimized temperature is within the allowable operating temperature range of the SSMMs.

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 5A shows a method for processing I/O requests from clients.

In step 500, I/O requests are received from one or more clients. The I/O requests may be client read requests and/or client write requests. The I/O requests may include other I/O requests without departing from the invention. The I/O requests may be received serially or in parallel.

In step 502, the storage appliance services the I/O requests. Servicing the I/O requests may involve, for example, sending read requests to one or more storage modules and/or sending one or more write requests to one or more storage modules.

In step 504, responses to the I/O requests are provided to the appropriate clients. The responses for the various types of requests are described above.

The method shown in FIG. 5A may be performed continuously during the operation of the storage appliance.

Though not shown in FIG. 5A, the storage appliance, as discussed above, may itself also be generating I/O requests. These I/O requests are also serviced by the appropriate storage modules. The I/O requests generated by the storage appliance may be processed before, after, and/or contemporaneously with I/O requests received from one or more clients. Accordingly, at any given time, the I/O requests being serviced by the storage modules may be: (i) only I/O requests from clients; (ii) only I/O requests from the storage appliance; or (iii) a combination of I/O requests from clients and I/O requests from the storage appliance.

FIG. 5B shows a method for determining I/O workload characterization (IWC) and then taking action in response to the IWC in accordance with one or more embodiments of the invention. The method shown in FIG. 5B may be performed in parallel with the method shown in FIG. 5A. Further, the method shown in FIG. 5B may be performed periodically. For example, the method shown in FIG. 5B may be performed every 20 minutes. The method shown in FIG. 5B may be performed more or less frequently without departing from the invention.

In step 510, the I/O requests (including I/O requests that are generated by the storage or received by the storage appliance but not yet processed and I/O requests that have been serviced by the storage appliance) are analyzed to determine an I/O workload characterization (IWC). More specifically, as I/O requests are generated and/or received by the storage appliance (see FIG. 5A, step 500), the storage appliance may record the time the I/O request was generated or received and the type of I/O request (e.g., read, write, etc.). This information may be stored in the memory of the control module. At time t, the I/O requests received at a certain time window prior to t are obtained and analyzed to determine the IWC for the storage appliance. For example, at time t the aforementioned information about all I/O requests received in the ten minutes preceding t are obtained from the memory and used to determine the IWC. Other time windows may be used without departing from the invention.

In step 512, the optimized temperature for the IWC is determined using the mapping in the memory of the control module.

In step 514, a determination is made about whether the current temperature (e.g., current average temperature) of the SSMMs in the storage appliance equal to the optimized temperature. The current average temperature of the SSMMs may be determined using one or more external sensors and/or one or more internal sensors (See FIGS. 2 and 3). If the optimized temperature obtained in step 512 is a single temperature, then determination in step 514 is whether the current temperature of the SSMMs is equal to the optimized temperature (optionally, ±a temperature variance) (e.g., 20° C.±3° C.). If the optimized temperature obtained in step 512 is a temperature range, then determination in step 514 is whether the current temperature of the SSMMs is within the temperature range (e.g., current temperature satisfies the following criterion: 60° C.≤current temperature≤70° C.). When the current temperature of the SSMMs in the storage appliance equal to the optimized temperature, the process ends; otherwise, the process proceeds to step 516.

In step 516, the control module modifies the operation of one or more active cooling components in order to alter the current temperature of the SSMMs in order that they reach the optimized temperature (determined in step 512). For example, if the optimized temperature is 70° C. and the current temperature is 40° C., then the control module may slow, stop, or temporarily stop operation of one or more fans in the storage appliance. In another example, if the optimized temperature is 20° C. and the current temperature is 40° C., then the control module may start and or increase the fan speed of one or more in the storage appliance. The control module uses input from the one or more internal sensors and/or one or more external sensors in order to modify (or optionally continually modify) the operation of the active cooling components in order to maintain the current temperature of the SSMMs are the optimized temperature.

Figure 6:
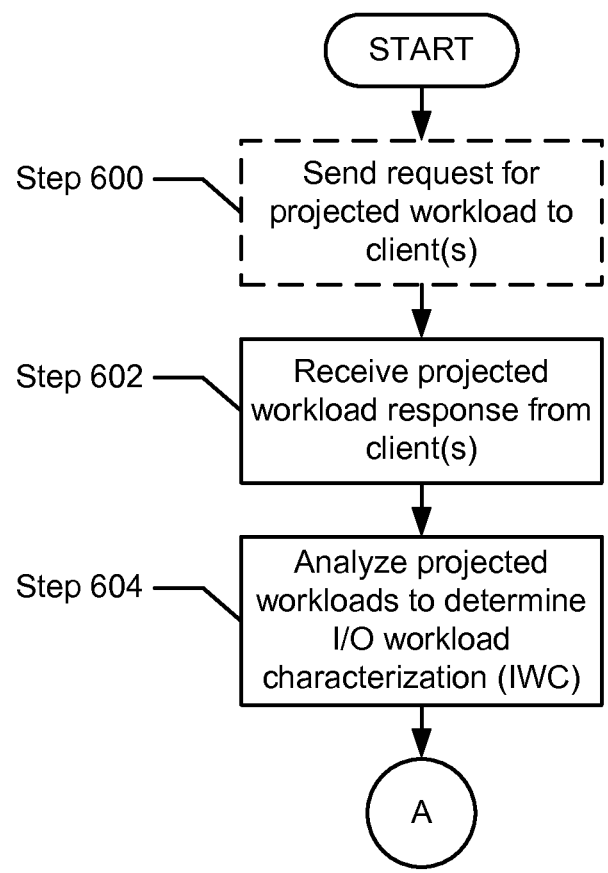

FIG. 6 shows a method for determining I/O workload characterization (IWC) in accordance with one or more embodiments of the invention. The method shown in FIG. 6 may be used to proactively determine future IWC for a storage appliance.

In step 600, the storage appliance may send a request for projected workload to one or more clients. The request may be in any format that is acceptable to the client. The request may include a future time for which a projected workload is requested. For example, the storage appliance may request a projected workload for the next hour, five hours, etc.

In step 602, one or more projected workloads is received from one or more clients. The projected workloads may be sent in response to a request in step 600 or may be sent proactively by the client without any request from the storage appliance.

In step 604, the projected workloads are analyzed to determine a IWC for a future time t. The storage appliance may then store this information and then prior to time t, the storage appliance may perform steps 512-516. The storage appliance may perform steps 512-516 prior to receive I/O requests at future time t such that the SSMMs are already operating at the optimized temperature prior to receiving I/O requests associated with IWC.

One or more embodiments of the invention may be implemented using instructions executed by one or more processors in the storage appliance. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a storage appliance, the method comprising:
   determining an input/output (I/O) workload characterization (IWC) for the storage appliance;
   determining an optimized temperature for a plurality of storage modules in the storage appliance based on the IWC, wherein the optimized temperature is a temperature at which latency of the plurality of storage modules is minimized while servicing I/O requests;
   determining that a current temperature of the plurality of storage modules is not the optimized temperature;
   modifying operation of at least one active cooling component in the storage appliance to change the current temperature of the plurality of storage modules to the optimized temperature.

2. The method of claim 1, wherein determining the IWC comprises:
   receiving a projected workload from a client, wherein the client is operatively connected to the storage appliance; and
   determining the IWC using the projected workload from the client.

3. The method of claim 1, wherein determining the IWC comprises:
   determining the IWC by analyzing I/O requests from at least one client operatively connected to the storage application.

4. The method of claim 3, wherein determining the IWC further comprises:
   analyzing I/O requests generated by the storage appliance.

5. The method of claim 4, wherein the I/O requests generated by the storage appliance are associated with a garbage collection operation.

6. The method of claim 1, wherein the IWC specifies a projected I/O workload for the storage at time t+1, wherein the IWC is determined at time t.

7. The method of claim 1, wherein the IWC specifies at least one selected from a group consisting of a projected I/O workload with predominately write request and a projected I/O workload with predominately read requests.

8. The method of claim 1, wherein at least one of the plurality of storage modules comprises a solid-state storage module.

9. The method of claim 8, wherein the solid-state storage module comprises NAND flash.

10. The method of claim 1, wherein the optimized temperature is a temperature range.

11. The method of claim 1, wherein the plurality of storage modules are associated with an operating temperature range, wherein the optimized temperature is at lower end of the operating temperature range when the IWC is predominately write requests, wherein the optimized temperature is at a higher end of the operating temperature range when the IWC is predominately read requests.

12. A system, comprising:
- a storage module comprising a storage module controller and persistent storage; and
- a control module operatively connected to the storage module and a client;
- an active cooling component operatively connected to the control module,
- wherein the control module:
    - determines an input/output (I/O) workload characterization (IWC) for a storage appliance;
    - determines an optimized temperature for the storage module in the storage appliance based on the IWC, wherein the optimized temperature is a temperature at which latency of the plurality of storage modules is minimized while servicing I/O requests;
    - determines that a current temperature of the storage module is not the optimized temperature; and
    - modifies operation of the active cooling component to change the current temperature of the storage module to the optimized temperature.

13. The system of claim 12, further comprising:
- an external sensor operatively connected to the control module and the storage module,
- wherein determining that the current temperature of the storage module is not the optimized temperature comprises obtaining a current temperature reading from the external sensor.

14. The system of claim 12, wherein the storage module further comprises an internal sensor operatively connected to the storage module controller and the persistent storage, wherein determining that the current temperature of the storage module is not the optimized temperature comprises obtaining a current temperature reading from the internal sensor.

15. The system of claim 12, wherein determining the IWC comprises:
- sending a request for a projected workload to a client, wherein the client is operatively connected to the control module;
- receiving a projected workload response from the client; and
- determining the IWC using the projected workload response.

16. The system of claim 12, wherein determining the IWC comprises:
- determining the IWC by analyzing I/O requests from at least one client operatively connected to the control module and analyzing I/O requests generated by the control module.

17. The system of claim 12, wherein the persistent storage comprises flash memory, wherein the flash memory is one selected from a group consisting of NOR flash memory and NAND flash memory.

18. The system of claim 12, wherein the active cooling component is a fan in the storage appliance.

19. A non-transitory computer readable medium comprising computer readable program code to:
- determine an input/output (I/O) workload characterization (IWC) for a storage appliance;
- determine an optimized temperature for a plurality of storage modules in the storage appliance based on the IWC, wherein the optimized temperature is a temperature at which latency of the plurality of storage modules is minimized while servicing I/O requests;
- determine that a current temperature of the plurality of storage modules is not the optimized temperature; and
- modify operation of at least one active cooling component in the storage appliance to change the current temperature of the plurality of storage modules to the optimized temperature.

20. The non-transitory computer readable medium of claim 19, wherein the computer readable program code further:
- sends a request for a projected workload to a client, wherein the client is operatively connected to the control module;
- receives the projected workload response from the client; and
- determines the IWC using the projected workload response, wherein the IWC specifies at least one selected from a group consisting of a projected I/O workload with predominately write request and a projected I/O workload with predominately read requests.

* * * * *